United States Patent
Mizuno

(10) Patent No.: US 9,694,789 B2
(45) Date of Patent: Jul. 4, 2017

(54) SWITCHING DEVICE

(71) Applicant: YAZAKI CORPORATION, Tokyo (JP)

(72) Inventor: Yoshiyuki Mizuno, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 345 days.

(21) Appl. No.: 14/548,562

(22) Filed: Nov. 20, 2014

(65) Prior Publication Data

US 2015/0076925 A1    Mar. 19, 2015

Related U.S. Application Data

(63) Continuation of application No. PCT/JP2013/069036, filed on Jul. 11, 2013.

(30) Foreign Application Priority Data

Jul. 13, 2012 (JP) .................. 2012-157839
Jun. 14, 2013 (JP) .................. 2013-125870

(51) Int. Cl.
*B60R 16/00* (2006.01)
*H01H 21/60* (2006.01)
(Continued)

(52) U.S. Cl.
CPC .......... *B60S 1/0811* (2013.01); *B60Q 1/1461* (2013.01); *B60R 16/005* (2013.01);
(Continued)

(58) Field of Classification Search
None
See application file for complete search history.

(56) References Cited

U.S. PATENT DOCUMENTS 5,977,494 A   11/1999   Sano et al.
6,025,565 A    2/2000   Miyase et al.
(Continued)

FOREIGN PATENT DOCUMENTS

EP    0 763 447 A2    3/1997
EP    0 939 009 A2    9/1999
(Continued)

OTHER PUBLICATIONS

English language Written Opinion of the International Search Report for PCT/JP2013/069036 dated Sep. 17, 2013.
(Continued)

*Primary Examiner* — Jared Fureman
*Assistant Examiner* — Aqeel Bukhari
(74) *Attorney, Agent, or Firm* — Kenealy Vaidya LLP

(57) ABSTRACT

A switching device includes an operation lever capable of being turned in a first direction and in a second direction with respect to a neutral position, a first switch to detect a condition when the operation lever is moved to a first operation position, a second switch to detect a condition when the operation lever is moved to a second operation position symmetric to the first operation position, and a control unit to control a multistage function in a stepwise manner to switch operating states in a stepwise manner such that the condition of control of the multistage function is switched up in a stepwise manner based on a condition detected by the first switch and such that the condition of control of the multistage function is switched down in a stepwise manner based on a condition detected by the second switch.

12 Claims, 6 Drawing Sheets

(51) Int. Cl.
    *B60S 1/08*     (2006.01)
    *B60Q 1/14*     (2006.01)
    *H01H 21/22*     (2006.01)

(52) U.S. Cl.
    CPC ............ *H01H 21/22* (2013.01); *H01H 21/60* (2013.01); *B60S 1/08* (2013.01); *B60S 1/0803* (2013.01); *Y10T 307/76* (2015.04)

(56) References Cited

U.S. PATENT DOCUMENTS

| | | | |
|---|---|---|---|
| 6,437,264 B1 | 8/2002 | Mizuta et al. | |
| 6,441,327 B1 | 8/2002 | Shibata et al. | |
| 6,713,693 B1 | 3/2004 | Sadowski et al. | |
| 2002/0046935 A1* | 4/2002 | Schwartz | B60Q 1/1461 200/61.54 |
| 2002/0134610 A1 | 9/2002 | Pastwa et al. | |
| 2003/0136655 A1 | 7/2003 | Rudolph et al. | |
| 2004/0217649 A1* | 11/2004 | Rouleau | B60R 16/027 307/10.1 |
| 2008/0195234 A1* | 8/2008 | Hallet | B60Q 1/1461 700/11 |

FOREIGN PATENT DOCUMENTS

| | | |
|---|---|---|
| EP | 1 054 422 A1 | 11/2000 |
| EP | 1 090 807 A2 | 4/2001 |
| GB | 2 363 819 A | 1/2002 |
| JP | 11-250772 A | 9/1999 |
| JP | 11-306923 A | 11/1999 |
| JP | 2001-260771 A | 9/2001 |
| JP | 2002-46620 A | 2/2002 |
| JP | 2010-105612 A | 5/2010 |
| JP | 2011-143862 A | 7/2011 |
| WO | 01/40020 A1 | 6/2001 |

OTHER PUBLICATIONS

Extended European search report for the related European Patent Application No. 13816449.6 dated Mar. 22, 2016.
Japanese Office Action for the related Japanese Patent Application No. 2013-125870 dated Jan. 26, 2017.
International Search Report and Written Opinion of the International Search Report for PCT/JP2013/069036 dated Sep. 17, 2013.

* cited by examiner

SWITCHING DEVICE

CROSS REFERENCE TO RELATED APPLICATIONS

This application is a continuation of International Patent Application No. PCT/JP2013/069036 filed on Jul. 11, 2013, claiming priority from Japanese Patent Application No. 2012-157839 filed Jul. 13, 2012 and Japanese Patent Application No. 2013-125870 filed Jun. 14, 2013, the entire contents of which are incorporated herein by reference.

FIELD OF INVENTION

The present invention relates to a switching device that controls a multistage function having a plurality of operating states and provided in a vehicle, such that the operating states are switched in a stepwise manner.

BACKGROUND ART

Conventionally, a wiper mechanism is provided in a vehicle, such as in an automobile, to wipe a windshield. For automobiles sold inside Japan, in most cases, a wiper control function is usually assigned to an operation lever arranged to protrude to the left of the steering column inside a vehicle interior. There is another operation lever arranged to protrude to the right of the steering column. The operation lever on the right side is used to control the direction indicator of the vehicle.

A common wiper device in a vehicle not only switches between ON and OFF states of a wiper operation, but also can perform adjustment of an operation speed or a mode of an intermittent operation (operation in which the wiper mechanism moves by a single back-and-forth motion whenever pre-appointed time elapses). Accordingly, various functions for the wiper control are assigned to the operation lever (on the left side) for a driver to control the wiper mechanism for each of the various types of operation positions.

As a conventional technique relating to the operation lever for such a wiper, a technique disclosed in Patent Document 1 is known.

According to Patent Document 1, four operation positions of "HI", "1UP", "OFF", and "MID" are provided in a range in which the operation lever can turn, and specific functions are assigned to each of the operation positions. Specifically, a neutral position, to which the operation lever returns when the operation lever is released from a driver's hand, is a position of "OFF" and operation of the wiper stops at this position. A function of raising a wiping speed of the wiper to the highest speed is assigned to the operation position of "HI". A function of shifting a wiping speed of the wiper one stage up on the high speed side is assigned to the operation position of "1UP". In addition, functions of "MIST" (mist) and shifting a wiping speed of the wiper one stage down on the low speed side (1DOWN) is assigned to the operation position of "MID". "MIST" means an operation mode in which the wiper is operated once.

In addition, in Patent Document 1, the angle of rotating from the position of "OFF" to the position of "1UP" is set to 5°, the angle of rotating from the position of "OFF" to the position of "HI" is set to 10°, and the angle of rotating from the position of "OFF" to the position of "MID" is set to 7°.

In addition, Patent Document 2 and Patent Document 3 disclose specific examples of a mechanism section that includes both a lever switch for direction indication and a lever switch for wiper control.

Patent Document 1: JP2010-105612A
Patent Document 2: JP11-250772A
Patent Document 3: JP2002-46620A Patent Document 1 discloses that a function of shifting the wiping speed of the wiper up one stage on the high speed side and a function of shifting the wiping speed of the wiper down one stage on the low speed side are provided. Accordingly, even when multistage operation positions are not provided on the operation lever, it is possible to adjust the wiping speed in a multistage manner. Accordingly, it is possible to simplify a configuration of the operation lever, and to reduce the number of switch contacts.

However, the operation lever disclosed in Patent Document 1 is provided taking into account only a control of the wiper device. Therefore, it is not possible to divert components of the operation lever or a switch unit connected thereto to those of other devices.

Usually, as illustrated in FIG. 1 in Patent Document 2, the operation lever is disposed on each of the right and left side of the steering column. In general, the operation lever on the left side is used for controlling the wiper device and the operation lever on the right side is used for controlling the direction indicator. In addition, in many cases, the operation lever on the left side and the operation lever on the right side have a structure in which the operation levers are turned up and down in a similar manner. However, since the respective operation positions provided in the operation lever on the left side and the respective operation positions provided in the operation lever on the right side are slightly different from each other, the structures of these operation levers are different from each other.

Accordingly, it is not possible to attach the operation lever on the left side that is designed for control of the wiper device and the switch unit connected thereto, instead of the operation lever on the right side and the switch unit on the right side. In contrast, it is not possible to attach the operation lever on the right side and the switch unit connected thereto that are designed for control of the direction indicator instead of the operation lever on the left side and the switch unit on the left side.

In addition, in the case of an automobile for the market inside Japan, the operation lever on the left side is used for control of the wiper device and the operation lever on the right side is used for the operation of the direction indicator. Meanwhile, in the case of an automobile for a market abroad such as in the U.S.A. as its destination, in general, the operation lever on the left side is used for control of the direction indicator and the operation lever on the right side is used for the control of the wiper device.

Therefore, in the case where an automobile that has a different destination is assembled, replacement of the operation lever and the switch unit between right and left has to be performed. In addition, since the right and left operation levers and switch units have slightly different structures from each other even when the components are similar, the components need to be carefully selected such that no misuse between the right and left attachment positions occurs during attachment. In addition, since there are no components in common to be used on both the right and the left, it is not possible to reduce the number of types of components and lower cost.

SUMMARY OF INVENTION

The present invention is made taking into account the above-described circumstances, and thus the object thereof is to provide a switching device of which a part of components have structures in common with those of other devices and in which it is easy to reduce the number of kinds of components.

To achieve the object described above, a switching device according to the present invention has the following features (1) to (7).

(1) A switching device includes an operation lever capable of being turned in a first direction and in a second direction opposite to the first direction with respect to a neutral position, a first switch to detect that the operation lever is moved to a first operation position disposed in the first direction with respect to the neutral position, a second switch to detect that the operation lever is moved to a second operation position symmetric to the first operation position with respect to the neutral position, and a control unit to control a multistage function having a plurality of operating states and provided in a vehicle such that the operating states are switched in a stepwise manner. The control unit switches up the operating state of the multistage function in a stepwise manner based on a condition detected by the first switch and switches down the operating state of the multistage function in a stepwise manner based on a condition detected by the second switch.

(2) The switching device having the configuration (1) described above, further includes a third switch to detect that the operation lever moves to a third operation position disposed in the first direction with respect to the first operation position and a fourth switch to detect that the operation lever is moved to a fourth operation position symmetric to the third operation position with respect to the neutral position. The control unit switches the operating state of the multistage function to an operating state in accordance with a condition detected by the third switch and a condition detected by the fourth switch.

(3) In the switching device having the configuration (2) described above, the multistage function is a wiper function for switching an operating state of a wiper, and the control unit switches to an operating state in which an operation of the wiper is stopped based on a change of the condition detected by one of the third switch and the fourth switch and switches to an operating state in which the operation of the wiper is performed at the highest speed based on a change of the condition detected by the other of the third switch and the fourth switch.

(4) In the switching device having the configuration (1) described above, the control unit determines the number of operations performed within a given period of time based on a change of at least one of the condition detected by the first switch and the condition detected by the second switch and switches the operating state of the multistage function to an operating state in accordance with a result of the determination.

(5) The switching device having the configuration (1) described above, further includes a switch unit in which the first switch and the second switch are mounted, and a connection unit connecting the switch unit and the operation lever in a detachable manner.

(6) In the switching device having the configuration (1) described above, the operation lever has a shape extending straight in a direction intersecting a direction in which the operation lever turns.

(7) The switching device having any one of the configurations (1) to (6) described above, includes at least two of the operation levers. The operation levers are provided to protrude from both sides of the steering column, respectively.

In the switching device having the configuration (1) described above, even when the multistage operation positions are not provided on the operation lever, it is possible to switch between the operating states of the multistage function. In addition, since the first operation position and the second operation position are disposed symmetrically with respect to the neutral position, a mechanism that supports the operation lever and a structure of the switch unit including the first switch and the second switch can be configured to be symmetrical. The operation lever and the switch unit that operate in such a symmetrical manner can be used not only for the wiper device but also for the direction indicating device. Therefore, the operation lever and the switch unit of the wiper device can have components in common with the direction indicating device, for example. Accordingly, the number of kinds of components mounted in a vehicle is reduced and it is possible to decrease the cost of components and the manufacturing cost.

In the switching device having the configuration (2) described above, since four types of operation positions are provided, it is possible to realize various operations in addition to the up down operations in order to switch between stages of the operating state.

In the switching device having the configuration (3) described above, in a case where it is desired to immediately stop the wiper during operation, the driver moves the operation lever to the third operation position or the fourth operation position without repeated operations of the operation lever, and thereby it is possible to stop the operation of the wiper. In addition, in a case where it is desired to immediately move the wiper at the highest speed, the driver moves the operation lever to the fourth operation position or the third operation position without repeated control of the operation lever, and thereby it is possible to switch to the operation at the highest speed.

In the switching device having the configuration (4) described above, it is possible to appropriately use a plurality of types of control depending on a difference of a period of time (speed) during which the driver controls the operation lever.

In the switching device having the configuration (5) described above, for example, even in a case where it is not possible to have an operation lever for the wiper device in common with the operation lever of the direction indicating device, the switch units can have components in common with each other.

In the switching device having the configuration (6) described above, for example, it is possible to configure the operation lever for the wiper device to have components in common with the operation lever for the direction indicating device. That is, since the shapes are symmetrical to each other, the operation lever attached on the right side of the steering column is rotated by 180 degrees and then can be attached on the left side of the steering column. In addition, in contrast, the operation lever attached on the left side of the steering column is rotated by 180 degrees and then can be attached on the right side of the steering column.

In the switching device having the configuration (7) described above, for example, it is possible to have the components of the operation lever and the switch unit of the wiper device in common with the components of the direction indicating device. Accordingly, the number of types of components mounted in a vehicle is reduced and it is possible to decrease the cost of components and the manufacturing cost.

In the switching device according to the present invention, a part of components of the switching device have structures in common with those of other devices (switching device of the direction indicator) and thus it is easy to reduce the number of types of components.

The present invention has been described concisely above. Further, embodiments for carrying out the present invention to be described below (hereinafter, referred to as "embodiment") are to be read through with reference to the accompanying drawings, and thereby the details of the present invention will be clearer.

EMBODIMENTS OF INVENTION

Specific embodiments related to a switching device according to the present invention will be described below with reference to drawings. Hereinafter, an aspect in which the switching device according to the present invention is applied to a wiper control device that controls a wiper will be described. The switching device according to the present invention is represented by a wiper function and can be applied to a control device that controls a multistage function having a plurality of operating states to switch between the operating states in a stepwise manner.

First Embodiment

Configuration of Device

Figure 1:
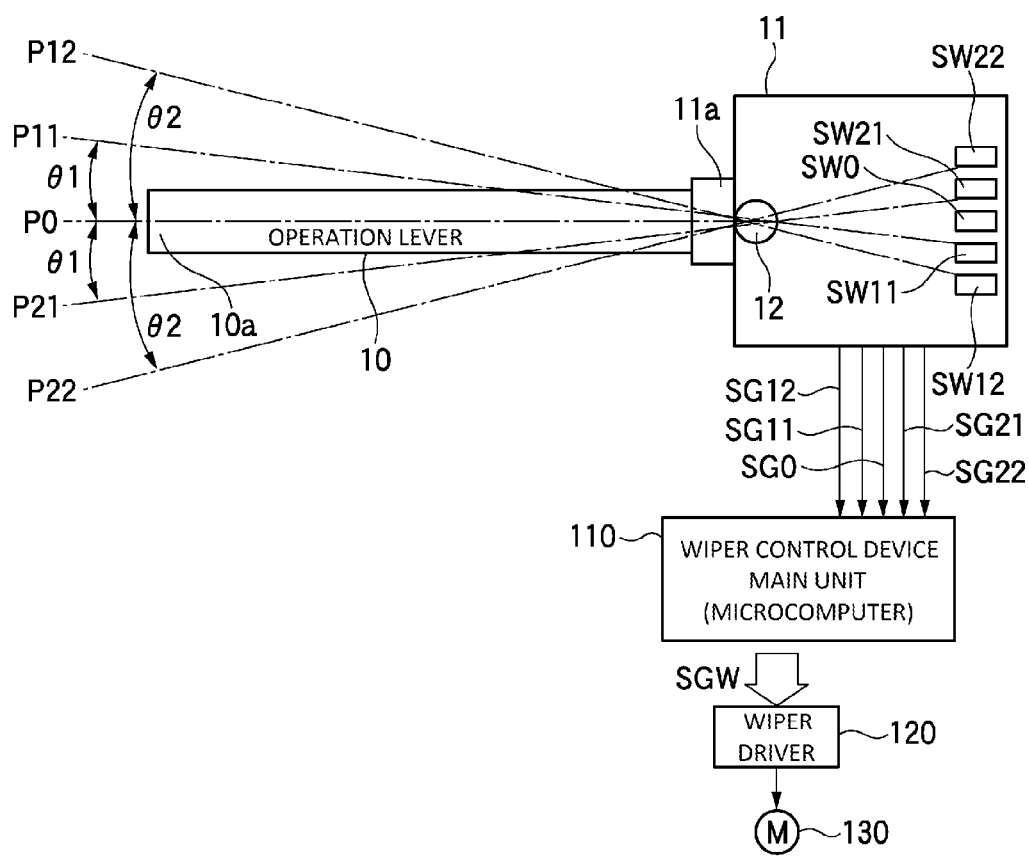
FIG. 1 is a block diagram illustrating a configuration example of a wiper control device according to a first embodiment.

A configuration example of the wiper control device according to the present embodiment is illustrated in FIG. 1. In addition, a front view of a disposition example of components on the periphery of a steering column in a real vehicle is illustrated in FIG. 3.

Position of Operation Lever or the Like

Figure 3:
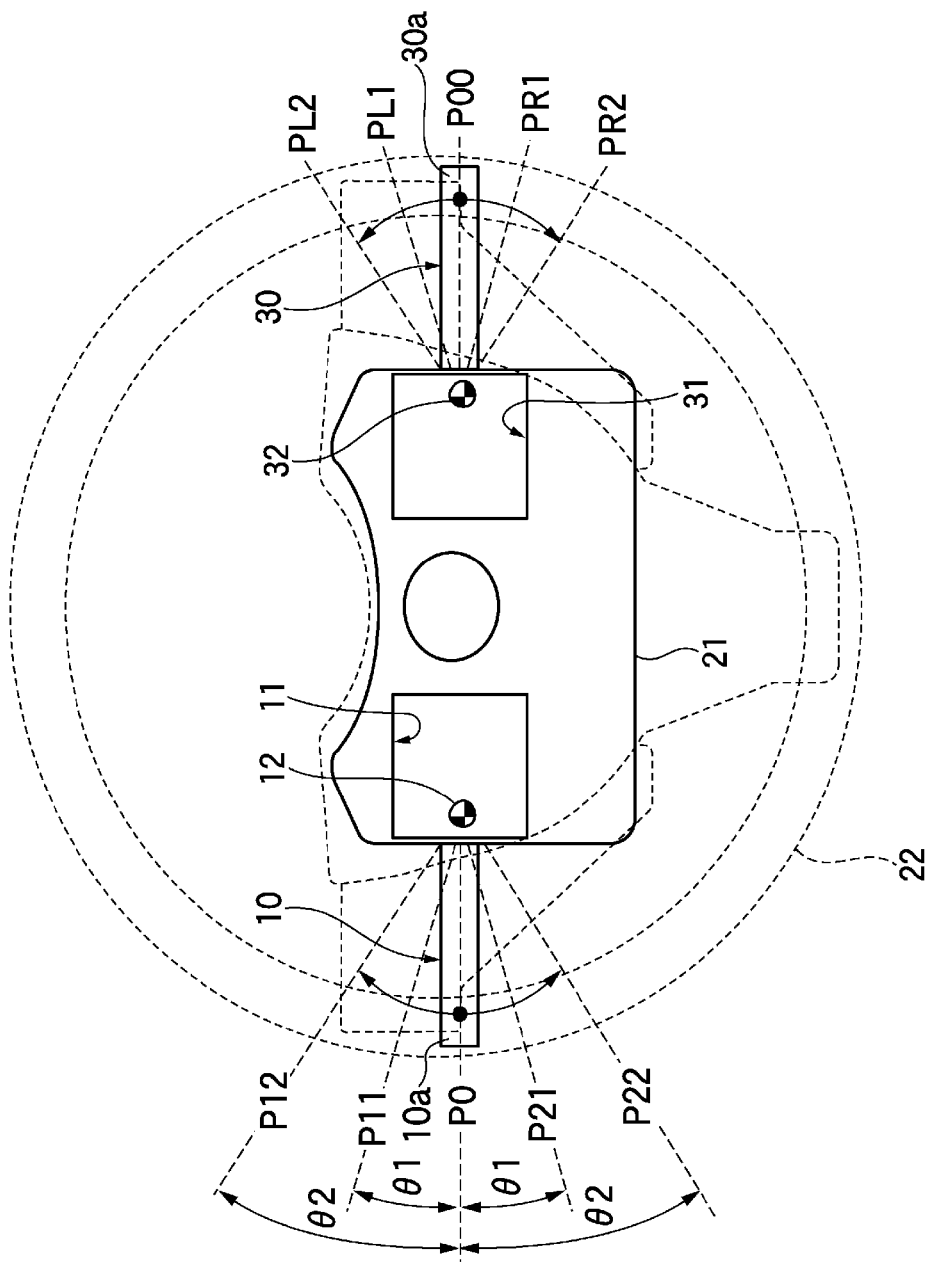
FIG. 3 is a front view illustrating a disposition example of components on the periphery of a steering column in a vehicle.

As illustrated in FIG. 3, in addition to a steering wheel 22, an operation lever 10 and an operation lever 30 are provided in the vicinity of a steering column 21 of the vehicle. The operation lever 10 that protrudes on the left side of the steering column 21 is used for control by a driver to switch between operating states of a wiper device which wipes the windshield of the vehicle. In addition, the operation lever 30 that protrudes on the right side of the steering column 21 is used for control by a driver to switch between operating states of a direction indicator of the vehicle. A shape of the operation lever 10 and the operation lever 30 is not limited to a straight bar shape, and may be a curved shape.

The disposition example as illustrated in FIG. 3 is applied to in the case of an automobile for the market inside Japan. In the case where a destination is an overseas market such as the U.S.A., positions of the right and left operation lever are reversed. That is, the operation lever 30 for controlling the direction indicator is disposed on the left side of the steering column 21, and the operation lever 10 for controlling the wiper device is disposed on the right side of the steering column 21.

As illustrated in FIG. 3, the operation lever 10 is connected to a switch unit 11 disposed inside the steering column 21 and supported by the switch unit 11. The operation lever 10 is supported such that it can be turned about a rotation shaft 12. In a usual state in which a driver does not apply a force, the operation lever 10 is positioned at a neutral position P0 automatically due to the restoring force of a spring (not illustrated). In an example of FIG. 3, the operation lever 10 formed in a bar shape intersects with the directions in which the operation lever 10 is turned, at the neutral position P0 and extends to the left from the rotation shaft 12 in the horizontal direction.

The driver applies a force to a lever end 10a of the operation lever 10 and thereby the operation lever 10 can move upward or downward. That is, the driver can perform control to position the operation lever 10 at each of operation positions P11, P12, P21, and P22 illustrated in FIG. 3.

The range in which the operation lever 10 is allowed to turn is limited from the operation position P12 to the operation position P22 due to an operation of a regulation member (not illustrated). The operation lever 10 performs a momentary operation. That is, even in a case where the driver moves the operation lever 10 to one of the operation positions P11, P12, P21, and P22, the operation lever 10 automatically returns to the neutral position P0 due to the force of the spring when the driver releases the operation lever 10.

As illustrated in FIG. 3, in terms of the operation position of the operation lever 10, the operation positions P11, P21 are disposed to be vertically symmetrical with respect to the neutral position P0. In addition, the operation positions P12 and P22 are disposed to be vertically symmetrical with respect to the neutral position P0. That is, a rotation angle θ1 of the operation lever 10 from the neutral position P0 to the operation position P11 is equal to a rotation angle θ1 of the operation lever 10 from the neutral position P0 to the operation position P21. In addition, a rotation angle θ2 of the operation lever 10 from the neutral position P0 to the operation position P12 is equal to a rotation angle θ2 of the operation lever 10 from the neutral position P0 to the operation position P22.

Similarly to the left side, the operation lever 30 on the right side is connected to a switch unit 31 disposed inside the steering column 21 and supported by the switch unit 31. The operation lever 30 is supported such that it can be turned about a rotation shaft 32. In a normal state in which a driver does not apply force, the operation lever 30 is automatically positioned at a neutral position P00 due to the restoring force of a spring (not illustrated). In the example of FIG. 3, the operation lever 30 formed in a bar shape extends to the right from the rotation shaft 32 in the horizontal direction to the neutral position P00.

The driver applies a force on a lever end 30a of the operation lever 30 and thereby the operation lever 30 can move upward or downward. That is, the driver can perform control to position the operation lever 30 at each of operation positions PL1, PL2, PR1, and PR2 illustrated in FIG. 3.

The range in which the operation lever 30 is allowed to turn is limited from the operation position PL2 to the operation position PR2 due to an operation of a regulation member (not illustrated). The operation lever 30 performs a momentary operation. That is, even in a case where the driver moves the operation lever 30 to one of the operation positions PL1, PL2, PR1, and PR2, the operation lever 30 automatically returns to the neutral position P00 due to the force of the spring when the driver releases the operation lever 10.

A function assigned at each of the operation positions PL1, PL2, PR1, and PR2 of the operation lever 30 is as follows.
PL1: Start of left direction indication (for lane change)
PL2: Start of left direction indication (for course change)
PR1: Start of right direction indication (for lane change)
PR2: Start of right direction indication (for course change)

In terms of the operation position of the operation lever 30, the operation positions PL1 and PR1 are disposed to be symmetrical vertically with respect to the neutral position P00. In addition, the operation positions PL2 and PR2 are disposed to be vertically symmetrical with respect to the neutral position P00. That is, a rotation angle of the operation lever 10 from the neutral position P00 to the operation position PL1 is equal to a rotation angle of the operation lever 30 from the neutral position P00 to the operation position PR1. In addition, a rotation angle of the operation lever 30 from the neutral position P00 to the operation position PL2 is equal to a rotation angle of the operation lever 30 from the neutral position P0 to the operation position PR2.

As described above, in the example of FIG. 3, the operation lever 10 on the left side has operation positions P11, P12, P21, and P22 which are symmetrical to each other with respect to the neutral position P0, and the operation lever 30 on the right side has operation positions PL1, PL2, PR1, and PR2 which are symmetrical to each other with respect to the neutral position P00. Thus, the switch unit 11 on the left side and the switch unit 31 on the right side can be in common, and the operation lever 10 and the operation lever 30 can be in common.

For example, the switch unit 11 is rotated by 180 degrees clockwise or counterclockwise and mounted on the steering column 21, and thereby it is possible to use the switch unit 11 instead of the switch unit 31. In contrast, the switch unit 31 is rotated by 180 degrees clockwise or counterclockwise and mounted on the steering column 21, and thereby it is possible to use the switch unit 31 instead of the switch unit 11. In addition, when the operation levers 10 and 30 have the bar shape extending straight, their components can be in common.

Entire Configuration of Device

As illustrated in FIG. 1, the operation lever 10 is connected to the switch unit 11 through a connection section 11a. That is, the operation lever 10 is inserted into and assembled with the connection section 11a formed on the switch unit 11 and can be integrally connected to the connection section. A mechanism that fixes the operation lever 10 and the connection section 11a to each other is configured to fit the operation lever and the connection section to each other by using a screwing or locking mechanism. In a case as a special electrical component (switch or the like) is mounted on the operation lever 10, the operation lever 10 and the switch unit 11 are configured to be electrically connectable by using a connector of the electrical component.

Thus, in a case of the configuration illustrated in FIG. 1, the operation lever 10 can be removed from and can be attached back to the switch unit 11. Therefore, for example, the operation lever 30 on the right side illustrated in FIG. 3 can be attached to the switch unit 11 on the left side. Alternatively, the operation lever 10 on the left side illustrated in FIG. 3 can be attached to the switch unit 31 on the right side.

As shown in FIG. 1, five switch contacts SW22, SW21, SW0, SW11, and SW12 are provided inside the switch unit 11. These switch contacts SW22, SW21, SW0, SW11, and SW12 turn on (closed) when the operation lever 10 moves to the operation positions P22, P21, P0, P11, and P12 corresponding to these switch contacts, respectively, and turn off (open) in other states.

Thus, it is possible to detect the control of the operation lever 10 to each of the operation positions P12, P11, P21, and P22 at each of the switch contacts SW12, SW11, SW21, and SW22. The switch contact SW0 that detects the neutral position P0 may or may not be provided. In addition, instead of these mechanical electric contacts, semiconductor switches or sensors can be used.

In the wiper control device illustrated in FIG. 1, electric signals SG12, SG11, SG0, SG21, and SG22 output from the switch contacts SW22, SW21, SW0, SW11, and SW12 in the switch unit 11 are input to a wiper control device main unit 110.

The wiper control device main unit 110 is configured of an electric circuit having a microcomputer as a main body. The microcomputer of the wiper control device main unit 110 (hereinafter, may be referred to as a microcomputer 110) executes control to be described and creates a control signal SGW based on the input electric signals SG12, SG11, SG0, SG21, and SG22. The control signal SGW is input to a wiper driving device 120. The wiper driving device 120 controls ON/OFF of driving, the driving speed, or the like of a wiper electric motor 130 in accordance with the control signal SGW.

Operation Mode of Wiper (Mn)

According to the present embodiment, the following operation modes are provided in the wiper.
0. Stop state
1. Intermittent operation
2. Continuous operation at low Speed
3. Continuous operation at high Speed In the stop state (Mn=0), an operation of the wiper electric motor 130 stops in a state in which a wiper mechanism is positioned at a predetermined receded position. During the intermittent operation (Mn=1), the wiper electric motor 130 is driven only during the movement of the wiper mechanism by a single back-and-forth motion whenever appointed time (changeable) elapses.

During the continuous operation at a low speed (Mn=2), the wiper electric motor 130 is continuously driven at the low speed and the wiper mechanism repeats the back-and-forth motions for wiping the windshield. During the continuous operation at a high speed (Mn=3), the wiper electric motor 130 is continuously driven at the high speed and the wiper mechanism repeats the back-and-forth motions for wiping the windshield.

The wiper driving device 120 receives an input of the control signal SGW that represents any one of four operation modes as described above and drives the wiper electric motor 130 in accordance with the input control signal SGW.

Correspondence Between Operation Positions of Operation Lever and Corresponding Functions According to the present embodiment, correspondence between the operation positions of the operation lever 10 and the corresponding functions are as follows.

P12: Wiper stop (Mn=0)
P11: Lower operation mode (Mn) one stage down
P0: No change
P21: Raise operation mode (Mn) one stage up
P22: Continuous operation at high speed (Mn=3)

In order to realize the functions as described above, the wiper control device main unit 110 creates the control signal SGW based on the electric signals SG12, SG11, SG0, SG21, and SG22 which are input from the switch unit 11. The control signal SGW represents a current operation mode (Mn).

The correspondence between the positions of the operation lever and the corresponding functions are changed in some cases. For example, in the case of a truck as the vehicle, there is a possibility that a function for controlling an auxiliary brake is assigned to the operation position P22 of the operation lever 10.

Operation of Device

Figure 2:
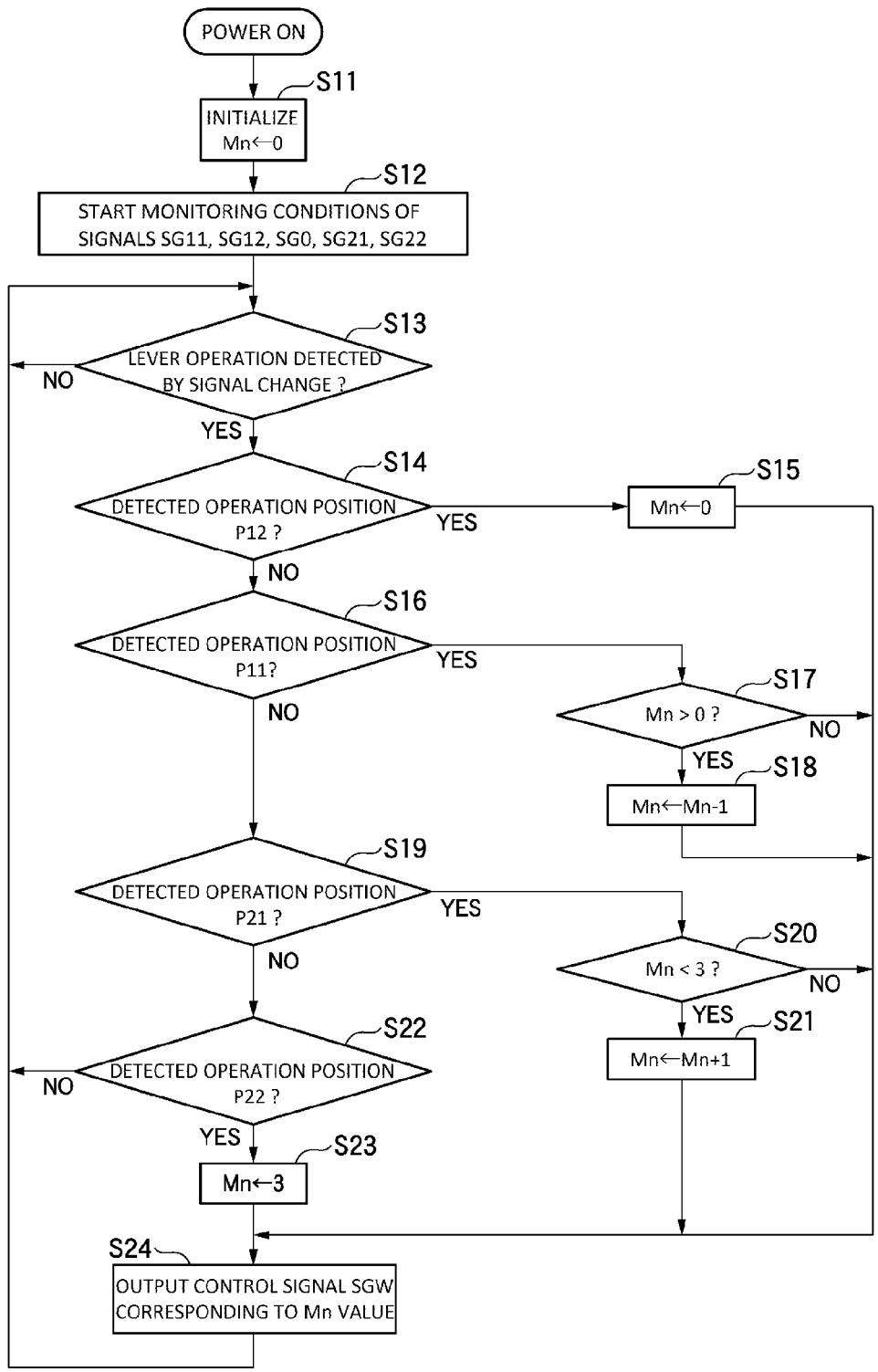
FIG. 2 is a flowchart illustrating an operation example of the wiper control device in FIG. 1.

An operation example of the wiper control device in FIG. 1 is illustrated in FIG. 2. That is, the microcomputer of the wiper control device main unit 110 executes control illustrated in FIG. 2. The operation illustrated in FIG. 2 is described from here on.

The microcomputer (110) initiates an operation from step S11 when the power turns on. In step S11, predetermined initialization is executed. That is, the microcomputer itself is initialized, simultaneously content of a memory that indicates the operation mode Mn is set to 0, and a control signal SGW corresponding to (Mn=0) is output. That is, the wiper stops in an initial state.

In step S12, the microcomputer (110) initiates state monitoring of the electric signals SG12, SG11, SG0, SG21, and SG22 that are input from the switch unit 11. That is, in a case where the driver controls the operation lever 10, the microcomputer reads the operating state.

In step S13, the microcomputer (110) determines whether or not control of the operation lever 10 due to a change of any one of the electric signals SG12, SG11, SG0, SG21, and SG22 is detected. When the lever control is detected, the process proceeds to next step S14.

In step S14, the microcomputer (110) determines whether or not a detected operation position is P12. In a case where the electric signal SG12 is switched from OFF to ON, it is considered that the operation lever 10 is controlled to the operation position P12 and the process proceeds to step S15. When the detected operation position is not P12, the process proceeds to step S16.

In step S15, the microcomputer (110) stores "0: Stop State" in the memory that indicates the operation mode Mn.

In step S16, the microcomputer (110) determines whether or not the detected position is P11. In a case where the electric signal SG11 is switched from OFF to ON, it is considered that the operation lever 10 is controlled to the operation position P11 and the process proceeds to step S17. When the detected operation position is not P11 the process proceeds to step S19.

In step S17, the microcomputer (110) compares the content of the memory indicating the current operation mode Mn with "0". When "Mn>0", the process proceeds to step S18 and when "Mn=0", the process proceeds to step S24.

In step S18, the microcomputer (110) updates the content of the memory such that the operation mode of the wiper is lowered one stage down. That is, the memory is updated to reduce a value of the memory indicating the current operation mode Mn by "1".

In step S19, the microcomputer (110) determines whether or not the detected operation position is P21. In a case where the electric signal SG21 is switched from OFF to ON, it is considered that the operation lever 10 is controlled to the operation position P21 and the process proceeds to step S20. When the detected operation position is not P21 the process proceeds to step S22.

In step S20, the microcomputer (110) compares the content of the memory indicating the current operation mode Mn with "3". When "Mn<3", the process proceeds to step S21 and when "Mn=3", the process proceeds to step S24.

In step S21, the microcomputer (110) updates the content of the memory such that the operation mode of the wiper is raised one stage up. That is, the memory is updated to increase the value of the memory indicating the current operation mode Mn by "1".

In step S22, the microcomputer (110) determines whether or not the detected operation position is P22. In a case where the electric signal SG22 is switched from OFF to ON, it is considered that the operation lever 10 is controlled to the operation position P22 and the process proceeds to step S23. When the detected operation position is not P22, the process returns to step S13.

In step S23, the microcomputer (110) updates the value of the memory indicating a value of the operation mode Mn to the maximum value "3" so as to switch the operation mode Mn to "Continuous operation at high speed".

In step S24, the microcomputer (110) outputs a control signal SGW corresponding to a value of the memory indicating a value of the latest operation mode Mn to the wiper driving device 120. Accordingly, in a case where the operation lever 10 is controlled to any one of the operation positions P11, P12, P21, and P22, a control signal SGW is output, in which the updated results in each of steps S15, S18, S21, and S23 are applied.

Advantages of Device

In the wiper control device according to the present embodiment, even in a case where the operating states of the wiper are switched in a stepwise manner, a driver can switch to all states (Mn=0 to 3) in a stepwise manner by appropriately using two types of operation positions P11, P21 of the operation lever 10. In addition, it is possible to switch immediately to the stop state (Mn=0) only by controlling once by using the operation position P12. In addition, it is possible to switch immediately to the continuous operation at a high speed (Mn=3) only by controlling once by using the operation position P22.

In addition, since the operation positions P11, P12, P21, and P22 of the operation lever 10 are symmetrical to each other with respect to the neutral position P0 and the rotation angles θ1 and θ2 upward and downward are equal, the switch unit 11 and the other switch unit 31 can be in common. Accordingly, even in a case where the switch units are switched between destinations of vehicles exclusively for the market inside Japan and for the market in the U.S.A., there is no need to switch between the attachment position of the switch unit 11 and the attachment position of the switch unit 31 illustrated in FIG. 3. Therefore, the components are in common, and thereby it is possible to lower the cost of the components themselves and to lower the cost of the manufacturing process during manufacturing a vehicle.

Second Embodiment

Configuration of Device

Figure 4:
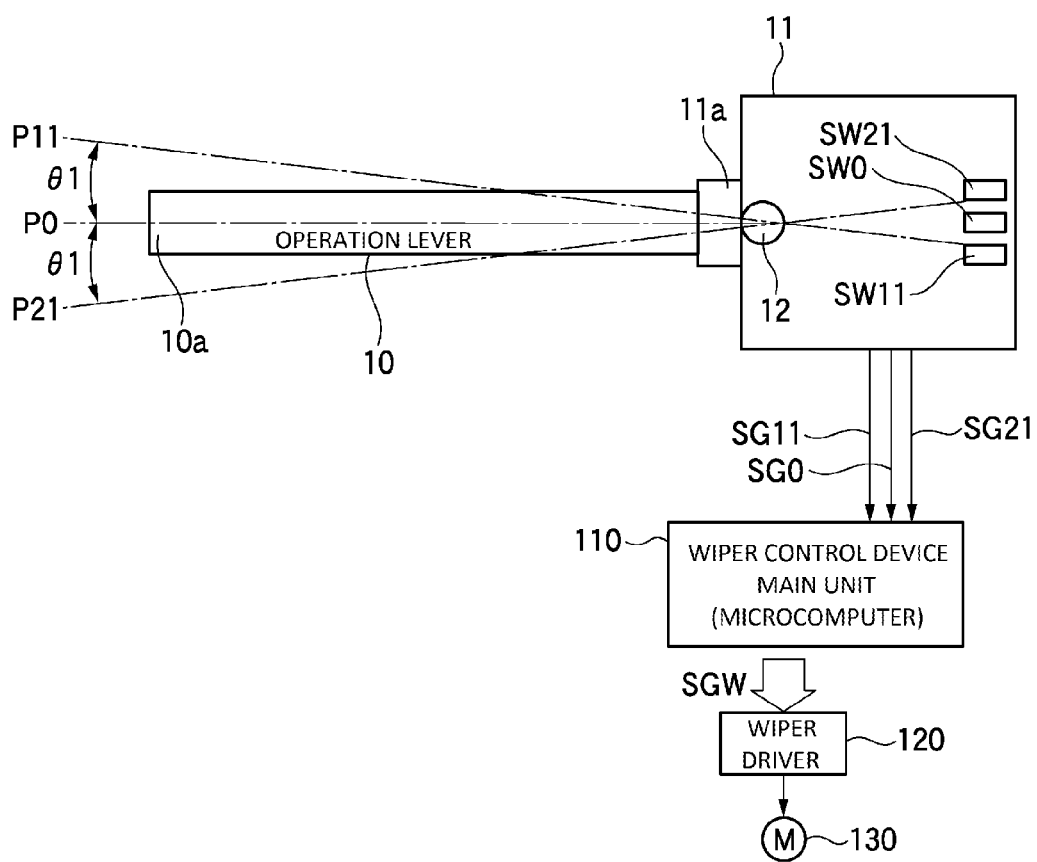
FIG. 4 is a block diagram illustrating a configuration example of a wiper control device in a second embodiment.

A configuration example of the wiper control device in the present embodiment is illustrated in FIG. 4. The same components in FIG. 4 as those in FIG. 1 are illustrated having the same reference signs.

The operation lever 10 and the switch unit 11 illustrated in FIG. 4 have the fewer number of the operation positions for the operation lever 10 compared to those in FIG. 1. That is, the operation lever 10 illustrated in FIG. 4 can turn only in a range from the operation position P11 to the operation position P21. In the switch unit 11 in FIG. 4, the switch contacts SW11, SW21, SW0 are provided corresponding to the operation positions P11, and P21 and the neutral position P0, respectively.

The wiper control device main unit 110 of FIG. 4 inputs the electric signals SG11, SG21, and SG0 output from the switch contacts SW11, SW21, and SW0 and controls the control signal SGW. Since the number of the input electric signals is decreased, the operation of the wiper control device main unit 110 is changed.

That is, in the present embodiment, correspondence between the control of the lever positions and the lever and the functions thereof are assigned as follows.
P11 (a case where the control is performed twice or more within a certain period of time):
Wiper stop (Mn=0)
P11 (a case where the control is performed only once within a certain period of time): Lower operation mode (Mn) one stage down
P0: No change
P21 (a case where the control is performed only once within a certain period of time): Raise operation mode (Mn) one stage up
P21 (a case where the control is performed twice or more within a certain period of time): Continuous operation at high speed (Mn=3)
In a case where the switch unit 11 illustrated in FIG. 4 is employed, it is desirable that, in the switch unit 31 on the right side illustrated in FIG. 3, the operation positions of the operation lever 30 be limited to only one stage (PL1 and PR1) so as to have the components in common. The other configurations except the above-described one are the same as the first embodiment.

Operation of Device

Figure 5:
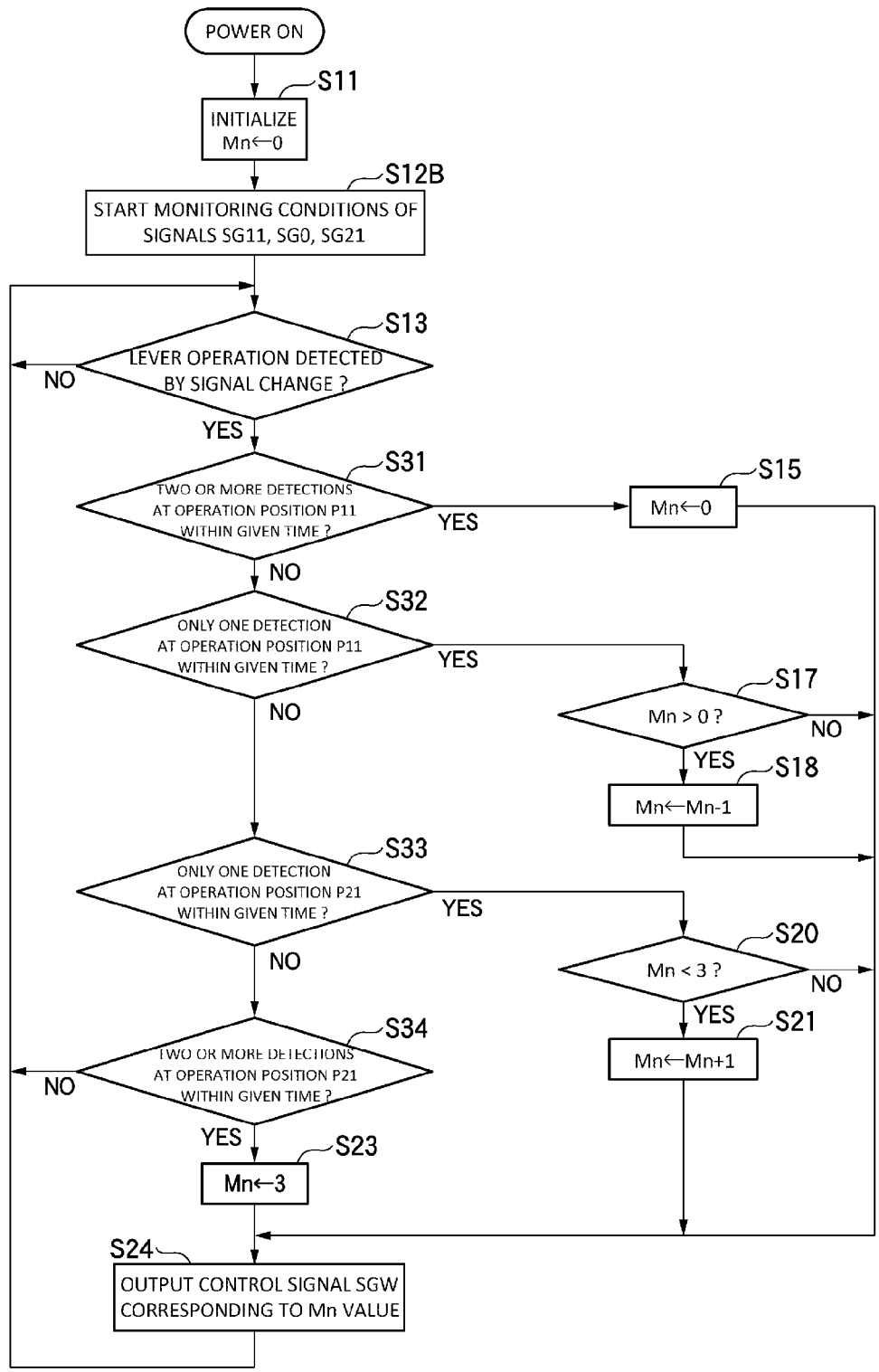
FIG. 5 is a flowchart illustrating an operation example of the wiper control device in FIG. 4.

An operation example of the wiper control device in FIG. 4 is illustrated in FIG. 5. That is, the microcomputer of the wiper control device main unit 110 executes control illustrated in FIG. 5. The processes in FIG. 5 corresponding to the processes in FIG. 2 are illustrated to have the same step numbers. The operation illustrated in FIG. 5 which is differently processed from in FIG. 2 is described from here on.

In step S12B, the microcomputer (110) initiates state monitoring of the electric signals SG11, SG0, and SG21 that are input from the switch unit 11. That is, in a case where a driver controls the operation lever 10, the microcomputer reads the control condition.

In step S31, the microcomputer (110) determines whether or not the control is detected twice or more within a certain period of time (e.g., for 1 second) at the operation position of P11. In a case where the control is detected twice or more, the process proceeds to step S15. Otherwise, the process proceeds to step S32. That is, in a case where the driver turns the operation lever 10 multiple times for a short time in the vicinity of the operation position P11, the microcomputer (110) reads the control and executes step S15.

In step S32, the microcomputer (110) determines whether or not the control is detected only once within a certain period of time (e.g., for 1 second) at the operation position of P11. In a case where the control is detected only once, the process proceeds to step S17. Otherwise, the process proceeds to step S33.

In step S33, the microcomputer (110) determines whether or not the control is detected only once within a certain period of time (e.g., for 1 second) at the operation position of P21. In a case where the control is detected only once, the process proceeds to step S20. Otherwise, the process proceeds to step S34.

In step S34, the microcomputer (110) determines whether or not the control is detected twice or more within a certain period of time (e.g., for 1 second) at the operation position of P21. In a case where the control is detected twice or more, the process proceeds to step S23. Otherwise, the process returns to step S13. That is, in a case where the driver turns the operation lever 10 multiple times for a short time in the vicinity of the operation position P21, the microcomputer (110) reads the control and executes step S23.

Advantages of Device

In the wiper control device according to the present embodiment, even in a case where the operating states of the wiper are switched in a stepwise manner, a driver can switch to all states (Mn=0 to 3) in a stepwise manner by appropriately using two types of operation positions P11, P21 of the operation lever 10.

In addition, the driver performs the control twice or more within a short time in the vicinity of the operation position P11, and thereby it is possible to switch rapidly to the stop state (Mn=0). In addition, the driver performs the control twice or more within a short time in the vicinity of the operation position P21, and thereby it is possible to switch rapidly to the continuous operation at a high speed (Mn=3).

In addition, since the operation positions P11, P21 of the operation lever 10 are symmetrical to each other with respect to the neutral position P0 and the rotation angles θ1 upward and downward are equal, the switch unit 11 and the other switch unit 31 can be in common. Accordingly, even in a case where the switch units are switched between destinations of vehicles exclusively for the market inside Japan and for the market in the U.S.A., there is no need to switch between the attachment position of the switch unit 11 and the attachment position of the switch unit 31 illustrated in FIG. 3. Therefore, the components are in common, and thereby it is possible to lower the cost of the components themselves and to lower the cost of the manufacturing process during manufacturing a vehicle.

Comparative Examples Other than the Above

Figure 6:
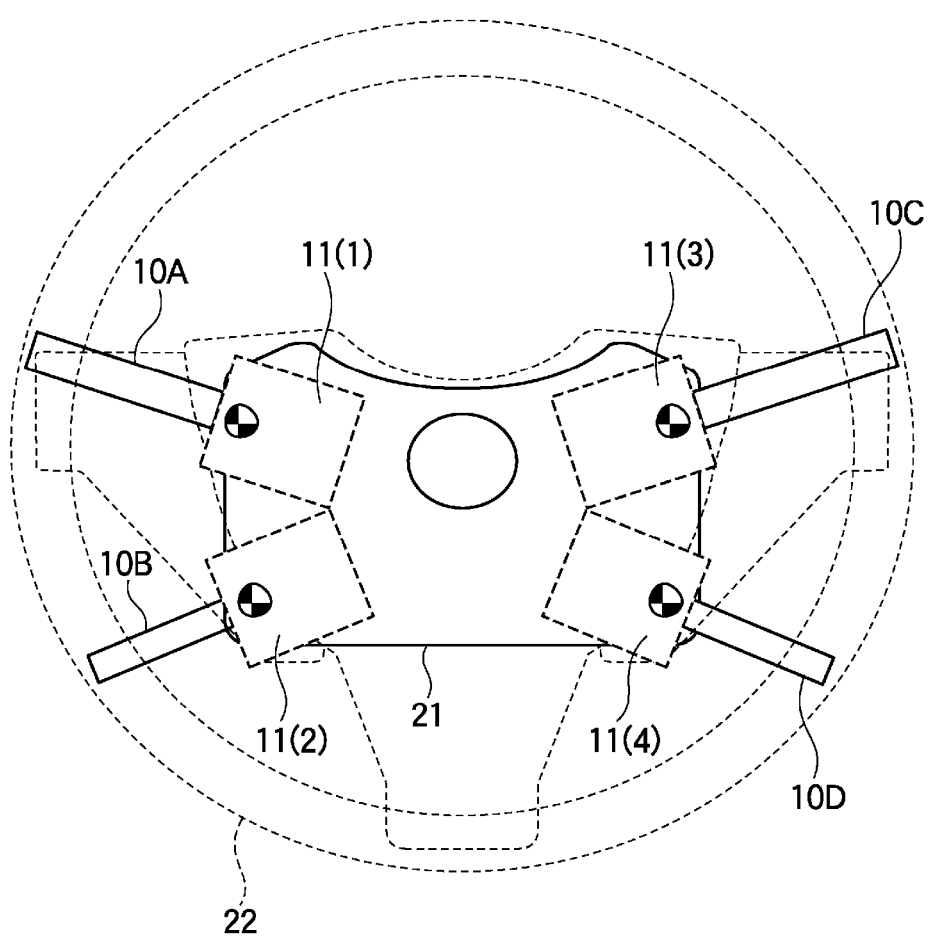
FIG. 6 is a front view illustrating a disposition example of components on the periphery of a steering column in a vehicle.

A front view of a disposition example of components on the periphery of the steering column in a vehicle is illustrated in FIG. 6. In a modification example illustrated in FIG. 6, four sets of switch units 11(1), 11(2), 11(3), and 11(4) are disposed on the steering column 21. The configurations of the switch units 11(1) to 11(4) are the same as in the case of the switch unit 11 illustrated in FIG. 1 or FIG. 4. The four switch units 11(1) to 11(4) are components in common with one another in configuration and shape.

In an example illustrated in FIG. 6, an operation lever 10A is connected to the switch unit 11(1), an operation lever 10B to the switch unit 11(2), an operation lever 10C to the switch unit 11(3), and an operation lever 10D to the switch unit 11(4). An attachment position of the switch unit 11(1) is a portion on the upper left side of the steering column 21 and an end of the operation lever 10A is disposed to direct slightly upward at the neutral position P0 described above. In addition, an attachment position of the switch unit 11(2) is a portion on the lower left side of the steering column 21 and an end of the operation lever 10B is disposed to point slightly downward at the neutral position P0 described above. In addition, the switch unit 11(3) and the operation lever 10C are disposed to be vertically symmetrical to the switch unit 11(1) and the operation lever 10A. In addition, the switch unit 11(4) and the operation lever 10D are disposed to be vertically symmetrical to the switch unit 11(2) and the operation lever 10B.

Similar to the operation lever 10 and the operation lever 30 illustrated in FIG. 3, functions of the operation lever 10A and the operation lever 10C illustrated in FIG. 6 are assumed to be assigned with the wiper control and the direction indicating control. Accordingly, it is possible to assign other functions to the other operation lever 10B and the operation lever 10D, as necessary.

Specific examples of functions that can be assigned to the operation lever 10B and the operation lever 10D include the following.
1. Control function of built-in audio apparatus
2. Control function of built-in display apparatus
3. Control function of built-in navigation apparatus
4. Various control functions for driving assistance In the first embodiment, the second embodiment, and the modification example according to the present invention described above, the switching device has been described, in which the operation lever 10 (or operation lever 10A) is assigned with operating states of the wiper device that wipes the windshield of a vehicle and the operation lever 30 (or operation lever 10C) is assigned with the operating states of the direction indicator of a vehicle. The switching device according to the present invention is not limited to an aspect in which the operation lever is assigned with the operating states of the wiper device or the operating states of the direction indicator. The switching device according to the present invention includes all cases where a plurality of operating states included in the multistage function are assigned to the operation positions of the operation lever in a range of the invention. Examples of the multistage functions include an autocruise function, an audio function, a multimedia function, and an automatic shift function, in addition to a wiper function, a lever turning function (direction indication function).

In the autocruise function, the extents to which a driving speed of a vehicle is accelerated or decelerated during automatic driving are assigned as the operating states. In the audio function, how many previous or following pieces of music are skipped during playing an audio source configured to have a plurality of pieces of music is assigned as operating states. In the multimedia function, how many previous or following chapters are skipped during playing a video configured to have a plurality of chapters is assigned as the operating states. In the automatic shift function, the extents to which a shift position of a vehicle is moved up and down are assigned as the operating states. Hereinafter, an example of correspondence between the operation positions of the operation lever 10 illustrated in FIG. 1 and FIG. 3 and operating states of the autocruise function, the audio function, the multimedia function, and the automatic shift function is described.

In a case where the autocruise function is assigned to the operation lever 10, correspondence between the operation positions of the operation lever 10 and operating states assigned by the autocruise function are as follows.

P12: Accelerate sequentially while the operation lever 10 is held.
P11: Reduce driving speed of the vehicle by one range.
P0: No change in driving speed of the vehicle.
P21: Reduce driving speed of the vehicle by one range.
P22: Decelerate sequentially while the operation lever 10 is held.

In a case where the audio function is assigned to the operation lever 10, correspondence between the operation positions of the operation lever 10 and operating states assigned by the audio function are as follows.
P12: Play the last music from the beginning.
P11: Play the next music following the music being played, from the beginning.
P0: No change in music being played.
P21: Play the music being played from the beginning.
P22: Play the previous music to the music being played, from the beginning.

In a case where the multimedia function is assigned to the operation lever 10, correspondence between the operation positions of the operation lever 10 and operating states assigned by the multimedia function are as follows.
P12: Play the last chapter from the beginning.
P11: Play the next chapter following the chapter being played, from the beginning.
P0: No change in chapter being played.
P21: Play the chapter being played from the beginning.
P22: Play the previous chapter to the chapter being played, from the beginning.

In a case where the automatic shift function is assigned to the operation lever 10, correspondence between the operation positions of the operation lever 10 and operating states assigned by the automatic shift function are as follows.
P12: Shift up vehicle shift position twice.
P11: Shift up vehicle shift position once.
P0: No change in vehicle shift position.
P21: Shift down vehicle shift position once.
P22: Shift down vehicle shift position twice.

The features of the embodiments of the switching device according to the present invention described above are briefly summarized in the following [1] to [7]

[1] A switching device including an operation lever (10) capable of being turned in a first direction and in a second direction opposite to the first direction with respect to a neutral position (P0), a first switch (SW11) to detect that the operation lever (10) is moved to a first operation position (P11) disposed in the first direction with respect to the neutral position (P0), a second switch (SW21) to detect that the operation lever (10) is moved to a second operation position (P21) symmetric to the first operation position (P11) with respect to the neutral position (P0), and a control unit (microcomputer 110) to control a multistage function having a plurality of operating states and mounted in a vehicle, such that the operating states are switched in a stepwise manner. The control unit switches up an operating state of the multistage function in a stepwise manner based on a condition detected by the first switch (SW11) and switches down the operating state of the multistage function in a stepwise manner based on a condition detected by the second switch (SW21).

[2] The switching device according to [1], further including a third switch (SW12) to detect that the operation lever (10) is moved to a third operation position (P12) disposed in the first direction with respect to the first operation position (P11), and a fourth switch (SW22) to detect that the operation lever (10) is moved to a fourth operation position (P22) symmetric to the third operation position (P12) with respect to the neutral position (P0). The control unit switches the operating state of the multistage function to an operating state in accordance with a condition detected by the third switch (SW12) and a condition detected by the fourth switch (SW22).

[3] In the switching device according to [2], the multistage function is a wiper function that switches an operating state of a wiper, and the control unit switches to an operating state in which the operation of the wiper is stopped based on a change of the condition detected by one of the third switch (SW12) and the fourth switch (SW22) and switches to an operating state in which the operation of the wiper is performed at the highest speed based on a change of the condition detected by the other of the third switch (SW12) and the fourth switch (SW22).

[4] The switching device according to [1], the control unit determines the number of operations performed within a given period of time based on a change of at least one of the condition detected by the first switch (SW11) and the condition detected by the second switch (SW21) and switches the operating state of the multistage function to an operating state in accordance with a result of the determination.

[5] The switching device according to [1], further including a switch unit in which the first switch (SW11) and the second switch (SW21) are mounted and a connection unit (11a) connecting the switch unit and the operation lever (10) in a detachable manner.

[6] In the switching device according to [1], the operation lever (10) has a shape extending straight in a direction intersecting a direction in which the operation lever (10) is turned moved.

[7] The switching device according to any one of [1] to [6], including at least two of the operation levers (10, 30). The operation levers (10, 30) are provided to protrude from both sides of the steering column (21), respectively.

While the present invention has been described in detail with respect to specific embodiments thereof, those skilled in the art will understand that various changes and modifications can be made therein without departing from the spirit and scope of the present invention.

What is claimed is:

1. A switching device comprising:
    an operation lever capable of being turned in a first direction and in a second direction opposite to the first direction with respect to a neutral position;
    a first switch to detect that the operation lever is moved to a first operation position disposed in the first direction with respect to the neutral position;
    a second switch to detect that the operation lever is moved to a second operation position symmetric to the first operation position with respect to the neutral position;
    a control unit to control a multistage function having a plurality of operating states and provided in a vehicle such that the operating states are switched in a stepwise manner,
    a switch unit in which the first switch and the second switch are mounted; and
    a connection unit connecting the switch unit and the operation lever in a detachable manner,
    wherein the control unit switches up an operating state of the multistage function in a stepwise manner based on a condition detected by the first switch and switches down the operating state of the multistage function in a stepwise manner based on a condition detected by the second switch.

2. The switching device according to claim 1, further comprising:
    a third switch to detect that the operation lever is moved to a third operation position disposed in the first direction with respect to the first operation position; and
    a fourth switch to detect that the operation lever is moved to a fourth operation position symmetric to the third operation position with respect to the neutral position,
    wherein the control unit switches the operating state of the multistage function to an operating state in accordance with a condition detected by the third switch and a condition detected by the fourth switch.

3. The switching device according to claim 2, wherein the multistage function is a wiper function for switching an operating state of a wiper, and
    wherein the control unit switches to an operating state in which an operation of the wiper is stopped based on a change of the condition detected by one of the third switch and the fourth switch and switches to an operating state in which the operation of the wiper is performed at highest speed based on a change of the condition detected by the other of the third switch and the fourth switch.

4. The switching device according to claim 1, wherein the control unit determines the number of operations performed within a given period of time based on a change of at least one of the condition detected by the first switch and the condition detected by the second switch and switches the operating state of the multistage function to an operating state in accordance with a result of the determination.

5. The switching device according to claim 1, wherein the operation lever has a shape extending straight in a direction intersecting the directions in which the operation lever turns.

6. The switching device according to claim 1, comprising:
    at least two of the operation levers,
    wherein the operation levers are provided to protrude from both sides of a steering column, respectively.

7. The switching device according to claim 1, wherein a rotation angle of the operation lever from the neutral position to the first operation position and a rotation angle of the operation lever from the neutral position to the second position are equal to each other.

8. The switching device according to claim 1, wherein the first switch is turned on when the operation lever is in the first operation position, the first switch is turned off when the operation lever is not in the first operation position, the second switch is turned on when the operation lever is in the second operation position, the second switch is turned off when the operation lever is not in the second operation position.

9. A switching device for a multistage function of a vehicle, the multistage function having a plurality of operating states, the switching device comprising:
    an operation lever movable in a first direction from a neutral position to a first position, and the operation lever is movable in a second direction from the neutral position to a second position, where the second direction is opposite to the first direction, and the second position is symmetric to the first position with respect to the neutral position;
    a first switch configured to detect the operation lever in the first position;
    a second switch configured to detect the operation lever in the second position;
    a switch unit in which the first switch and the second switch are mounted;

a connection unit detachably connecting the switch unit to the operation lever; and a control unit configured to control the plurality of operating states of the multistage function based on a selected one of a plurality of predetermined state values, where the each of the state values corresponds to a respective one of the operating states, the control unit being configured to select one of the predetermined state values by, incrementing a control value if the first switch detects the operation lever in the first position, decrementing the control value if the second switch detects the operation lever in the second position, and subsequently selecting one of the state values that corresponds to the control value, and the control unit being further configured to output a control signal to the multistage function to engage one of the plurality of operating states that corresponds to the selected one of the state values.

10. The switching device according to claim 9, wherein the operation lever is movable in the first direction from the neutral position to a third position that is spaced away from the first position, and the operation lever is movable in the second direction from the neutral position to a fourth position that is spaced away from the second position, where the fourth position is symmetric to the third position with respect to the neutral position, the switch device further comprising:

a third switch configured to detect the operation lever in the third position; and a fourth switch configured to detect the operation lever in the fourth position, wherein the control unit is configured to, select a first predetermined one of the state values if the third switch detects the operation lever in the third position, and select a second predetermined one of the state values if the fourth switch detects the operation lever in the fourth position.

11. The switching device according to claim 9, wherein a movement amount of the operation lever from the neutral position to the first position and a movement amount of the operation lever from the neutral position to the second position are equal to each other.

12. The switching device according to claim 9, wherein the first switch is turned on when the operation lever is in the first position, the first switch is turned off when the operation lever is not in the first position, the second switch is turned on when the operation lever is in the second position, the second switch is turned off when the operation lever is not in the second position.

* * * * *